April 19, 1960  C. J. DOUBT ET AL  2,933,377
PROCESS FOR MAKING NON-CAKING AND FREE-FLOWING SODIUM NITRITE
Filed Aug. 1, 1956
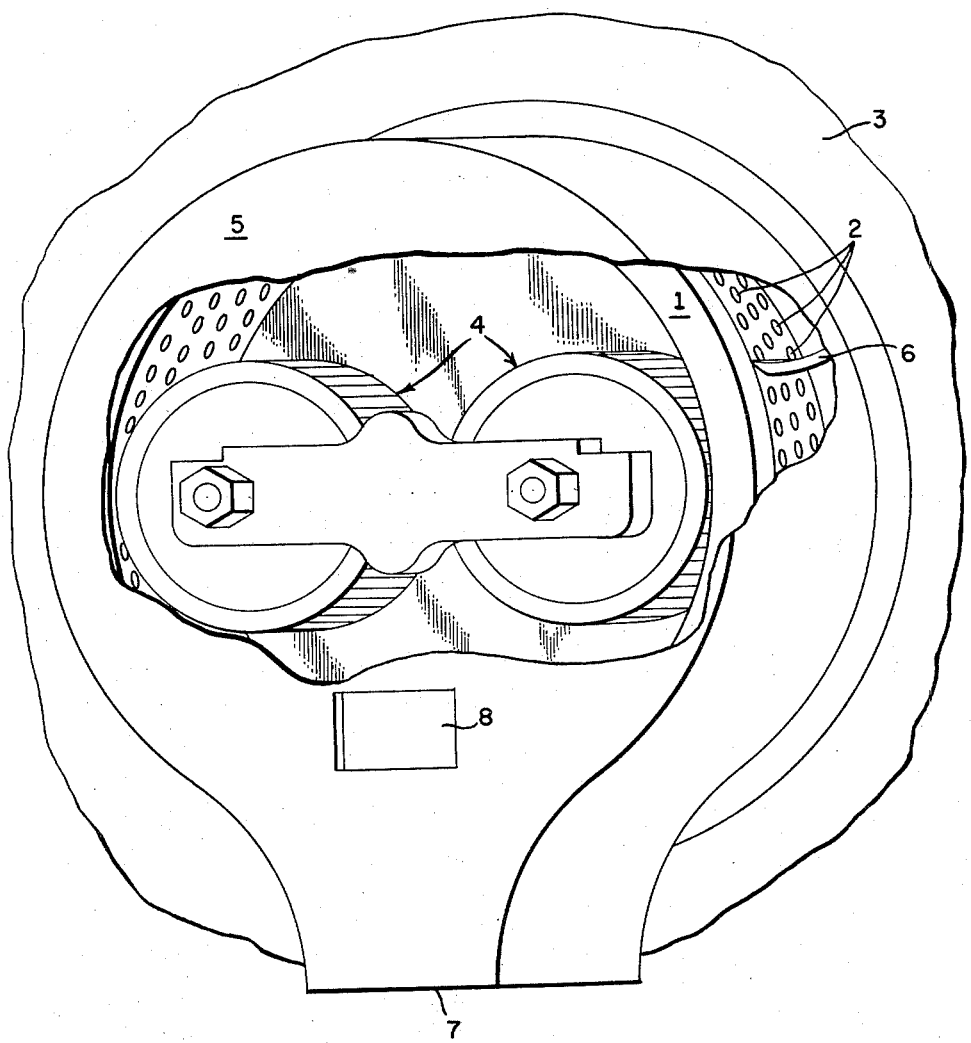
INVENTORS
CECIL J. DOUBT
HENRY R. NELSON
BY *Julius H. Steinberg* ATTORNEY

United States Patent Office 2,933,377
Patented Apr. 19, 1960

2,933,377

PROCESS FOR MAKING NON-CAKING AND FREE-FLOWING SODIUM NITRITE

Cecil J. Doubt, Hagerstown, Md., and Henry R. Nelson, Pennsville, N.J., assignors to E. I. du Pont de Nemours and Company, Wilmington, Del., a corporation of Delaware Application August 1, 1956, Serial No. 601,487

2 Claims. (Cl. 23—313)

This invention relates to an improved form of solid sodium nitrite and, more particularly, to a novel process of preparing solid sodium nitrite in a pelleted form which is free-flowing.

Sodium nitrite is a chemical compound of considerable importance in a wide variety of industrial applications. One important method of manufacture at the present time consists of absorbing in an alkaline solution the oxides of nitrogen which result from the catalytic oxidation of ammonia. By proper control of conditions, sodium nitrite is obtained in a solution which is substantially free from carbonates and nitrates. The sodium nitrite solution may then be concentrated and crystallized to produce the granular solid salt.

While the product obtained by the foregoing process is satisfactory from the standpoint of purity, the granular salt has the extreme disadvantage of caking upon storage. The action of atmospheric moisture on the granular salt invariably causes the crystallized product to become caked or set so that a solid block of material results which can only be broken up by mechanical impact.

The object of the present invention is to provide a solid sodium nitrite in a form which is free-flowing and will remain free-flowing even after long periods of storage. A further object is to provide such a product which will not cake or set if left standing for long periods of time. A still further object of the invention is to provide a method of accomplishing such a free-flowing sodium nitrite salt without contaminating the salt, such as by the use of antisetting agents. Other and additional objects will become apparent from the ensuing specification and claims.

We have found that the foregoing objects may be accomplished if the granular sodium nitrite is converted into the form of small, dense, hard pellets which do not crumble or fall apart upon storage. By our method, the moisture content of the granular salt is first adjusted within certain specified limits, and the salt is then forced under pressure through a die having a multiplicity of generally circular openings. The dense, compact strands which emerge from the discharge face of die are then sliced into short segments to give a product consisting almost entirely of hard, compact, generally cylindrical pellets.

Referring to the attached drawing, the figure represents an elevational view with parts broken away for illustration purposes of one type of apparatus which may be employed for carrying out the method of the present invention.

In the attached drawing, 1 represents a rotary die cage having a plurality of generally circular boreholes 2. The die cage is mounted on a carriage which, in turn, is driven by a motor (not shown) behind face plate 3. A pair of aligned rollers 4 are mounted for idle rotation within the die cage 1. The axes of the rollers are adjustable and may be positioned such that the rollers either just abut the inner face of the die cage or are spaced a short distance therefrom. Our experience has demonstrated that the best results are achieved with the rollers just barely touching the inner face of the die cage. The entire mechanism is provided with a casing 5, having a slicing blade or blades 6 mounted on its inner surface and a discharge orifice 7 at the bottom for discharge of the pelleted product.

The operation of the device is as follows: granular sodium nitrite is fed by any suitable means, as for example, a feeder chute or funnel (not shown) into the interior of the bottom portion of the die cage 1 through a suitable trap 8 in the casing 5. The die cage is rotated at high speed and the incoming salt is pressed by contact with the rollers 4 through the boreholes 2 in the die cage. Blades 6 are so positioned that the dense strands of sodium nitrite emerging from the boreholes on the discharge face of the die cage are sliced at appropriate lengths. The hard cylindrical pellets which thus result fall by gravity means through the discharge orifice 7 where they are carried away, as for example, by a continuous conveyor (not shown).

The apparatus just described is intended as exemplary only as illustrating one type of apparatus which may be used to carry out the process of the present invention. Neither the apparatus nor any of its components forms any part of the invention inasmuch as many other and different types of apparatus may be used for carrying out our process. For example, uniplanar die plates with rotary knives may be used in lieu of the die cage 1 and blade 6 illustrated in the attached figure. Our invention resides in a novel process, and the product produced thereby, and is not limited by the structural details of any particular type of pelleting equipment.

In the particular apparatus depicted, the die cage may be of any suitable dimensions. The same is true of the boreholes 2. We have found that a 1⅜" thick stainless steel die having boreholes with a diameter of 3/16" is especially suitable. Generally speaking, die cages having a thickness of about 1" offer enough frictional resistance to the passage of the granular salt to accomplish the desired compacting for pelletizing purposes. Stainless steel is preferred over carbon steels since it will not significantly increase the iron content of the salt.

The knife blades 6 may be suitably spaced and suitably positioned on the inside of the casing 5, depending upon the speed with which the die cage is rotated and the feed rate of the granular salt. It will be readily apparent that there are many configurations and species of such blades which are operative and, indeed, there are numerous types of blades, both fixed and rotary, which may be substituted for that shown in the attached figure in order to slice the strands of nitrite emerging from the die. Our invention is not limited to or in any way dependent on any specific type of blade or its position with respect to the die.

The invention is illustrated by the following example: moisture was added to granular sodium nitrite (99.5% pure on a dry basis) until the moisture content reached 3.74% by weight, based on the dry salt. The moist salt was fed at 30° C. into the apparatus depicted in the attached drawing at the rate of 1800 pounds per hour. The apparatus was equipped with a stainless steel die cage having a multiplicity of perforations 1⅜ inches long and 3/16 inch in diameter which was rotated by a 50 horsepower motor. The rollers were adjusted to just barely touch the high spots of the die as it rotated. Roller speed was about 285 r.p.m. Smooth, hard, dense, cylindrical pellets of sodium nitrite emerged from the discharge orifice at a temperature of about 80° C. The pellets were placed in a circulating hot air dryer at 140° C. for about 30 minutes. After removal from the oven, the pellets of sodium nitrite contained about 0.4% by weight of moisture.

A critical feature of our invention is the adjustment of the moisture content of the salt prior to its extrusion. We have found that at least about 2% moisture by weight, and not more than about 9% moisture by weight, is necessary if the objects of the invention are to be achieved. Within this broad range 2.5% to 5%, by weight, represents by far the preferred operating conditions. Similarly, we have found that there is a critical moisture content in the final product which must be observed if the pellets are to hold their shape and remain free-flowing over long periods of time. After the pelleting step, the pellets must be dried so that they contain not more than about 1.5% moisture by weight and preferably less than about 0.5% moisture.

The pelleted sodium nitrite of the present invention will remain free-flowing over a very wide range of pellet sizes. Generally speaking, however, we have found that the length of the majority of the pellets should not exceed their cross-sectional diameter by more than a factor of about 3. For example, with the apparatus depicted in the drawing, pellets having a diameter of 3/16 of an inch and lengths up to about 1/2" have been prepared with satisfactory properties. Since the die cage is rotating at relatively fast speeds, it will be readily apparent that the lengths of the pellets will vary considerably up to a maximum of about 1 inch. In terms of particle size, about 66% of such pellets are larger than 8-mesh and 10% are larger than 14-mesh (U.S. Sieve Series).

The method of the present invention is not only convenient and economical, but also permits high-speed operation. For example, the apparatus in the attached drawing is capable of pelleting granular sodium nitrite at rates up to about 3,000 pounds per hour when the die cage is powered with a 100 H.P. motor. In addition, the pellets obtained by this process are so compact and dense relative to the ordinary granular material that an increase in the bulk density of the material is accomplished. Notwithstanding this dense compactness, however, the solution properties of the salt are not materially affected. For example, it took only two minutes to prepare a 25% aqueous solution at 35° C. with the pelleted product of the invention as compared to 1/2 min. for the regular crystallized salt at the same temperature. It is thus apparent that the time needed to dissolve the pelleted nitrite as compared to the granular salt is not very different. Thus, a great enhancement in the flow properties of the salt is achieved with little sacrifice in other desirable properties.

The enhanced flow properties of our pelleted product are accomplished with absolutely no adulteration of the product such as results when diluents, antisetting agents, or the like are employed for this purpose.

We have conducted numerous tests on the storage properties of the pelleted product of our novel process compared with those of the ordinary granular salt. We have found, for example, that storage of several barrels of the pelleted salt in a high humidity atmosphere for a period of a week will not disturb the free-flowing characteristics of the pellets in the least. On the other hand, a barrel of ordinary granular salt stored under identical conditions will be caked solid at the end of that time.

Barrels of the pelleted product of our process have been stored up to three months with no deterioration in the free-flowing characteristics of the pelleted product. In all of these storage tests, the control barrels of granular sodium nitrite always caked solid.

We have described our invention at length in the foregoing specification. It is to be expressly understood, however, that many variations may be introduced in the details of operation, the methods of control, and/or the equipment employed without departing from the scope of the invention. We intend, therefore, to be limited only by the following claims.

We claim:

1. A process for converting granular sodium nitrite to a non-caking, free-flowing form which comprises first adjusting the moisture content of the granular salt to about 2 to 9% water by weight, forcing the moisture-adjusted salt through a die having a multiplicity of generally circular openings, slicing the strands emerging from said die into segments having lengths the majority of which are not more than about three times the cross-sectional diameter of the strand in each instance, and drying the pellets thus obtained to a moisture content which is sufficiently low so that the pellets will not crumble when stored, said final moisture content after drying being less than about 1.5% by weight.

2. A process as in claim 1 in which the initial moisture content of the granular salt is adjusted to between about 2.5–5% water by weight.

References Cited in the file of this patent

UNITED STATES PATENTS

| | | |
|---|---|---|
| 2,348,847 | Pike | May 16, 1944 |
| 2,456,393 | Duncan | Dec. 14, 1948 |
| 2,764,951 | Fisher | Oct. 2, 1956 |

OTHER REFERENCES

"Agglomeration," Chemical Engineering, October 1951, pages 161–174.

Sprout-Waldron Manufacturing Engineers Bulletin 182—Pellet Ace for the Processing Industries, 4 pages.